US012552403B2

(12) United States Patent
Brinker et al.

(10) Patent No.: US 12,552,403 B2
(45) Date of Patent: Feb. 17, 2026

(54) AGRICULTURAL IMPLEMENTS HAVING IMAGER SYSTEMS AND RELATED METHODS AND SYSTEMS

(71) Applicant: AGCO Corporation, Duluth, GA (US)

(72) Inventors: Jarret Lee Brinker, Beloit, KS (US); Ross Duerksen, Hesston, KS (US); Benjamin Anson Fanshier, Hesston, KS (US); Robert L. Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 230 days.

(21) Appl. No.: 18/466,394

(22) Filed: Sep. 13, 2023

(65) Prior Publication Data
US 2024/0101141 A1 Mar. 28, 2024

Related U.S. Application Data

(60) Provisional application No. 63/377,164, filed on Sep. 26, 2022.

(51) Int. Cl.
*B60W 50/14* (2020.01)
*A01B 63/02* (2006.01)
(Continued)

(52) U.S. Cl.
CPC ............ *B60W 50/14* (2013.01); *A01B 63/02* (2013.01); *G06T 7/70* (2017.01); *G06V 10/70* (2022.01);
(Continued)

(58) Field of Classification Search
CPC ........... B60W 50/14; B60W 2050/146; B60W 2300/152; A01B 63/02; A01B 49/06;
(Continued)

(56) References Cited

U.S. PATENT DOCUMENTS 4,365,268 A * 12/1982 Allen .................. A01B 69/001
172/430
4,555,725 A * 11/1985 Geiersbach .......... A01B 69/001
348/120
(Continued)

FOREIGN PATENT DOCUMENTS

AU 704742 B3 5/1999
DE 19631831 A1 2/1998
(Continued)

OTHER PUBLICATIONS

European Patent Office, Search Report for EP Application No. EP23197650.7, dated Feb. 9, 2024, 13 pages.
UK Patent Office, Search Report for related GB Application No. GB2214824.1, dated Mar. 28, 2023, 4 pages.

*Primary Examiner* — Eric Blount

(57) ABSTRACT

A system includes an agricultural implement and a tractor for pulling the implement. The implement includes a frame supporting at least one ground-engaging tool and at least one image imager system coupled to a longitudinal end of the frame. The tractor includes a central controller, wherein the at least imager system is operably coupled to the central controller. The central controller is configured to receive image data from an imager system, analyze the image data to identify at least one mark formed in a soil surface, and responsive to identifying the at least one mark, cause feedback regarding a current position and orientation of the implement and an ideal position and orientation of the implement to be output via an input/output device.

19 Claims, 8 Drawing Sheets

(51) Int. Cl.
*G06T 7/70* (2017.01)
*G06V 10/70* (2022.01)
*G06V 20/10* (2022.01)
*G06V 20/56* (2022.01)

(52) U.S. Cl.
CPC .............. *G06V 20/10* (2022.01); *G06V 20/56* (2022.01); *B60W 2050/146* (2013.01); *B60W 2300/152* (2013.01); *G06T 2207/20081* (2013.01); *G06T 2207/30188* (2013.01); *G06T 2207/30252* (2013.01)

(58) Field of Classification Search
CPC ....... A01B 69/001; A01B 69/008; G06T 7/70; G06T 2207/20081; G06T 2207/30188; G06T 2207/30252; G06V 10/70; G06V 20/10; G06V 20/56; A01C 7/208
USPC .......................................................... 340/439
See application file for complete search history.

(56) References Cited

U.S. PATENT DOCUMENTS

| 10,820,478 | B1* | 11/2020 | Ferrari ................. A01B 79/005 |
| 11,653,587 | B2* | 5/2023 | Kraus .................. A01B 69/001 |
| | | | 701/50 |
| 11,770,992 | B2* | 10/2023 | Dix .......................... G05D 1/81 |
| | | | 701/50 |
| 2003/0145571 | A1 | 8/2003 | Diekhans |
| 2019/0059199 | A1* | 2/2019 | Stanhope ............. A01B 69/008 |
| 2020/0033146 | A1 | 1/2020 | Cash et al. |
| 2021/0191408 | A1 | 6/2021 | Hayashida et al. |
| 2022/0078961 | A1* | 3/2022 | Kraus ...................... G06T 5/50 |
| 2023/0273614 | A1* | 8/2023 | Fjelstad ............... G05D 1/0276 |
| | | | 701/50 |
| 2024/0202922 | A1* | 6/2024 | Deljkovic .............. A01G 17/02 |

FOREIGN PATENT DOCUMENTS

| DE | 10147862 A1 | 4/2003 |
| DE | 102004045724 A1 | 3/2006 |
| EP | 2316259 A1 | 5/2011 |

* cited by examiner

AGRICULTURAL IMPLEMENTS HAVING IMAGER SYSTEMS AND RELATED METHODS AND SYSTEMS

CROSS-REFERENCE TO RELATED APPLICATION

This application claims the benefit of the filing date of U.S. Provisional Patent Application 63/377,164, "Agricultural Implements Having Imager Systems and Related Methods and Systems," filed Sep. 26, 2022, the entire disclosure of which is incorporated herein by reference.

FIELD

Embodiments of the present disclosure relate generally to agricultural implements, and particularly to planters or other implements that having image sensors to detect marks made during a previous pass by an implement through a field.

BACKGROUND

It is well known in the art that some agricultural implements, such as planters and drills, need to be moved precisely along a field. For instance, when an operator is planting the field and/or applying fertilizer to the field, it is desirable to completely cover a predetermined area of the field by making multiple passes across the field with the implement. In making such planting and/or fertilization passes, the operator will generally prefer to minimize overlapping coverage by adjacent passes. By minimizing overlapping of adjacent passes, the operator will generally minimize seed and/or fertilizer waste, reduce planting and/or fertilization time, and reduce fuel usage and other associated operation costs.

Thus, to provide suitable planting efficiency, implements have long included a shiftable marker with a coulter disc. In the conventional form, the marker is selectively shifted to extend laterally from the implement so that the coulter disc cuts into the ground at a location spaced laterally from the implement. Thus, as the implement makes a pass along the field, the disc cuts a trench in the field parallel to the pass. The trench serves as a visual indicator for the operator to follow and align the implement during the next adjacent pass. When field operations are completed, the marker may be retracted from its extended (or unfolded) condition so that the implement can be transported.

BRIEF SUMMARY

Some embodiments of the disclosure include a system comprising an agricultural implement and a vehicle configured to pull the implement and having a central controller. The implement may include a frame extending perpendicular to a forward direction of travel of the implement and having longitudinal ends distal from a center of the implement. The implement may further include a plurality of ground-engaging tools carried by the frame and at least one imager system coupled to the frame proximate one of the longitudinal ends of the frame. The at least one imager system is operably coupled to the central controller. The central controller comprises at least one processor and at least one non-transitory computer-readable storage medium storing instructions thereon. The instructions, when executed by the at least one processor, cause the central controller to receive image data from the at least one imager system, and based at least partially on the received image data, cause feedback regarding a current position and orientation of the implement and an ideal position and orientation of the implement to be output via an input/output device.

In some embodiments, the at least one imager system includes a plurality of cameras having different viewing angles.

In some embodiments, the at least one imager system is configured to provide image data to a guidance system of a central controller.

In some embodiments, the at least one imager system includes at least one actuator for rotating a lens of the at least one imager system about at least one axis.

In some embodiments, the at least one imager system includes at least two imager systems, with a first imager system being coupled to a first longitudinal end of the frame and a second imager system being coupled to a second, opposite longitudinal end of the frame.

In some embodiments, the at least one imager system includes at least one of a 3D laser scanner (LiDAR), a 2D laser scanner (LiDAR), a CCD sensor, a CMOS sensor, a stereoscopic camera, a monoscopic camera, an infrared (IR) camera, a short-wave infrared (SWIR) camera, or a digital single-reflex camera.

In some embodiments, the at least one imager system is coupled to the frame via an arm.

In some embodiments, the arm includes a telescopic arm.

In some embodiments, the arm is rotatably coupled to the frame.

Embodiments of the disclosure include a method of controlling operation of an implement. The method may include receiving image data from an imager system, the image data including images of at least a portion of a previous pass performed by the implement through a field, analyzing the image data to identify at least one mark formed in a soil surface by the previous pass, determining a current position and orientation of the implement relative to the previous pass, determining an ideal position and orientation of the implement relative to the previous pass, and causing the current position and orientation and the ideal position and orientation of the implement to be output via an input/output device.

In some embodiments, analyzing the image data includes analyzing the image data via at least one deep learning model.

In some embodiments, causing the current position and orientation and the ideal position and orientation of the implement to be output via the input/output device includes displaying at least a portion the image data via the input/output device, displaying a guidance marker representing the ideal position and orientation of the implement and overlaying the guidance marker over a first region of the displayed image data, and displaying an alignment marker representing the current position and orientation of the implement and overlaying the alignment marker over a second region of the displayed image data.

The method may also include controlling operation of the implement to improve an alignment between the determined current position and orientation and the determined ideal position and orientation.

In some embodiments, causing the current position and orientation and the ideal position and orientation of the implement to be output via the input/output device includes causing the current position and orientation and the ideal position and orientation of the implement to be indicated on a monitor of a tractor pulling the implement.

In some embodiments, overlaying the guidance marker over a region of the displayed image data includes overlaying the guidance marker over a region of the displayed image data representing the identified at least one mark.

The method may also include determining a color of at least one of the guidance marker or the alignment marker based on a proximity of the guidance marker and the alignment marker.

In some embodiments, controlling operation of the implement to improve an alignment between the determined current position and orientation and the determined ideal position and orientation is performed automatically without operator input. O Some embodiments of the disclosure include a system that includes an agricultural implement and a tractor configured to pull the implement. The implement may include a frame supporting at least one of ground-engaging tools and at least one imager system coupled to a longitudinal end of the frame. The tractor may include a central controller, where the at least one imager system is operably coupled to the central controller. The central controller may include at least one processor and at least one non-transitory computer-readable storage medium storing instructions thereon that, when executed by the at least one processor, cause the central controller to receive image data from the at least one imager system, analyze the image data to identify at least one mark formed in a soil surface, and responsive to identifying the at least one mark, and cause feedback regarding a current position and orientation of the implement and an ideal position and orientation of the implement to be output via an input/output device.

In some embodiments, analyzing the image data to identify the at least one mark formed in the soil surface includes analyzing the image data via at least one deep learning technique.

In some embodiments, the input/output device includes a monitor within the tractor.

Other technical features may be readily apparent to one skilled in the art from the following figures, descriptions, and claims.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
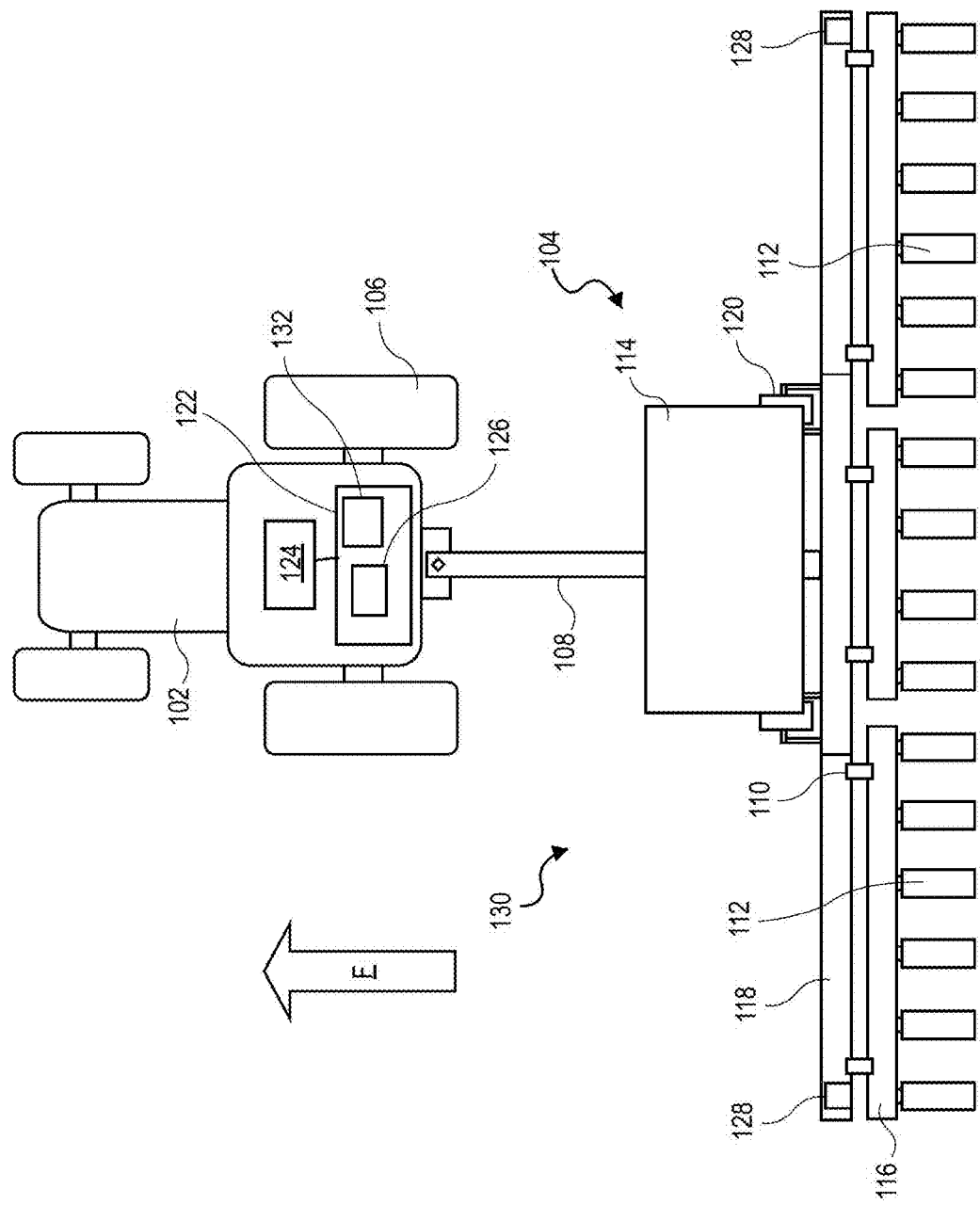
FIG. 1 is a simplified top view of a tractor pulling an agricultural implement according to one or more embodiments of the disclosure.

Illustrations presented herein are not meant to be actual views of any particular agricultural implement, imager system, guidance system, component, or system, but are merely idealized representations that are employed to describe embodiments of the disclosure. Additionally, elements common between figures may retain the same numerical designation for convenience and clarity.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "third," etc. is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "and/or" includes any and all combinations of one or more of the associated listed items.

Embodiments of the present disclosure include a guidance system that utilizes imager systems (e.g., cameras) coupled to a frame of an implement to detect marks (e.g., a last row planted) formed in a soil surface during a previous pass through a field. The guidance system also displays image data (e.g., video captured by the imager systems) on a display within a tractor and overlays guidance and alignment markers over the image data to assist an operator in navigating the implement and to align a current pass through the field with the previous pass through the field. For example, the guidance system may cause video captured by the imager systems to be displayed on the display, and the video may include one or more views of the detected marks (e.g., a portion of the previous pass). The guidance system may overlay a guidance marker over a region of the video representing the detected mark(s), and the guidance marker may represent an ideal position and orientation of the implement during a current pass through the field in order to align with the previous pass. Likewise, the guidance system may overlay an alignment marker over the video, and the alignment marker may represent a current position and orientation of the implement relative to the ideal position and orientation of the implement. Accordingly, during operation, the operator may navigate the implement (e.g., a tractor pulling the implement) to align the alignment marker within the guidance marker.

The guidance system and the method of controlling operation of a tractor and/or an implement by detecting one or more markers via imager systems of the current disclosure may provide advantages over conventional marker assemblies (e.g., foldable markers) and methods of controlling operation of tractors and implements based on markers. For example, because the marks may be detected by the imager systems and guidance system and not an operator, the guidance system may increase a range of hours during a day within which an implement may be properly operated when relying on marks for alignment. Furthermore, in some embodiments, the guidance system may remove any need for an operator to visually detect the marks in the soil surface. As a result, the guidance system may reduce the likelihood of an operator mistaking marks and/or missing marks. Therefore, the guidance system may reduce operator error and may improve operator performance.

Moreover, the structure of guidance system may be significantly smaller than conventional folding markers and related systems. Likewise, the guidance system may be less expensive than conventional folding markers and related systems. Additionally, the guidance system may improve accuracy of forming adjacent passes with appropriate spacing or the lack thereof between the adjacent passes within a field. Accordingly, the guidance system may minimize overlapping between passes and may minimize unused soil surface, which minimizes seed and/or fertilizer waste. Moreover, by improving accuracy, the guidance system may reduce planting and fertilization time and may reduce fuel usage and operation costs, while improving yield.

FIG. 1 is a simplified top view of a tractor 102 pulling an implement 104 (e.g., a planter) in a forward direction of travel F, according to one or more embodiments of the disclosure. The tractor 102 may be supported by wheels 106 and/or tracks. A drawbar 108 may connect the implement 104 to a hitch of the tractor 102. The implement 104 may include a frame 118 extending perpendicular to a forward direction of travel of the implement 104 and having longitudinal ends distal from a center of the implement 104. The frame 118 supports a plurality of row units 112 at preselected locations, and may also support a tank 114 carrying seeds, fertilizer, a pesticide, etc. The row units 112 may be carried by one or more toolbars 116, which may be adjustable relative to the frame 118 by mounts 110. The row units 112 may include various ground-engaging tools, such as opening discs, seed meters, closing discs, material applicators, tillage tools, etc. One or more wheels 120 may support the frame 118 as the implement 104 travels.

The tractor 102 may further include a central controller 122 in, for example, a cab of the tractor 102. The central controller 122 may include a guidance system 132 (e.g., a guidance system application) and at least one input/output device 126. The central controller 122 may be configured to control one or more operations and devices of the tractor 102 and/or the implement 104. In some embodiments, the implement 104 may further include one or more imager systems 128 mounted to distal longitudinal ends of the frame 118. The imager systems 128 may be operably coupled to the guidance system 132 of the central controller 122 and may be at least partially operated by the guidance system 132. As is described in further detail below, the imager systems 128 may be capture image data (e.g., image/video data) of one or more marks (e.g., a last row planted) on a soil surface 130 formed during a previous pass (e.g., planting pass) over the soil surface 130 and to provide the image data (e.g., image/video data) to the guidance system 132 of the central controller 122. Additionally, the tractor 102 may include a global position system ("GPS 124") mounted to the tractor 102 and operably connected to (e.g., in communication with) the central controller 122. The GPS 124 may operate in conventional manners and may provide GPS data to the central controller 122.

The input/output device 126 may allow an operator of the tractor 102 to provide input to, receive output from, and otherwise transfer data to and receive data from central controller 122. The input/output device 126 may include a mouse, a keypad or a keyboard, a joystick, a touch screen, a camera, an optical scanner, network interface, modem, other known I/O devices or a combination of such I/O interfaces. The input/output device 126 may include one or more devices for presenting output to an operator, including, but not limited to, a graphics engine, a display (e.g., a display screen), one or more output drivers (e.g., display drivers), one or more audio speakers, and one or more audio drivers. In certain embodiments, the input/output device 126 is configured to provide graphical data to a display for presentation to an operator. The graphical data may be representative of one or more graphical user interfaces and/or any other graphical content as may serve a particular implementation. As is described in greater detail below, the central controller 122 and the input/output device 126 may be utilized to display data (e.g., images and/or video data) received from the one or more imager systems 128 and provide one or more guidance marks overlaying images and/or video data to assist an operator in navigating the tractor 102 and implement 104 and properly aligning a current pass of the implement 104 with a previous pass through a field. The central controller 122 is described in greater detail below in regard to FIG. 8.

Referring still to FIG. 1, while the guidance system 132 is described as being part of the central controller 122, the disclosure is not so limited. Rather, the guidance system 132 may be part of (e.g., operated on) another device in communication with the central controller 122. In further embodiments, the guidance system 132 may be part of one or more servers or remote devices in communication with the central controller 122. As a non-limiting example, the tractor 102 may be an autonomous machine, and the cab may be omitted. In those embodiments, the central controller 122 may operate the tractor 102 and may receive at least some instructions from a remote operator or system (e.g., the guidance system 132) via a wireless link.

Figure 2:
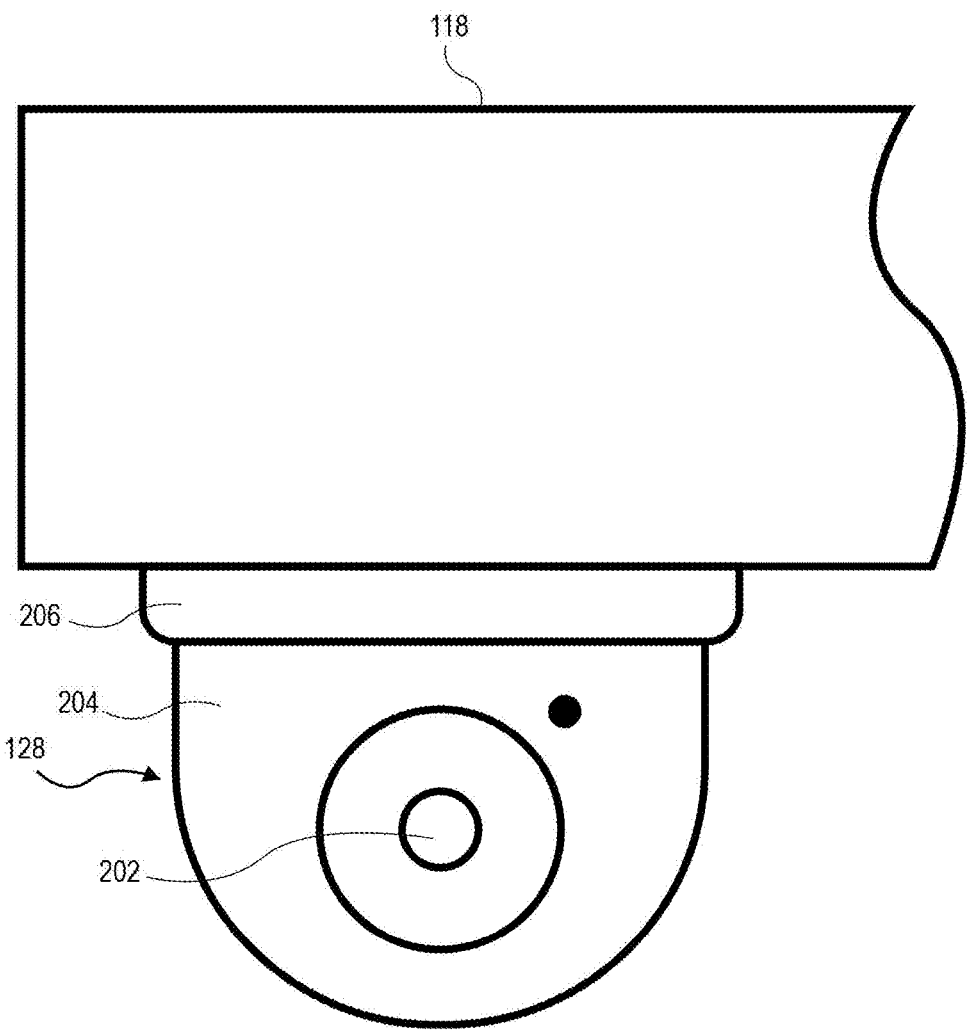
FIG. 2 shows a simplified view of an imager system according to one or more embodiments of the disclosure.

FIG. 2 is a schematic view of an imager system 128 according to one or more embodiments. As shown in FIG. 2, the imager system 128 may be mounted to the frame 118 of the implement 104. In some embodiments, the imager system 128 may be mounted to a bottom surface of the frame 118 of the implement 104, as depicted in FIG. 2. In additional embodiments, the imager system 128 may be mounted to a top surface, a side surface, and/or a longitudinal end surface of the frame 118 of the implement 104. In yet further embodiments, the imager system 128 may be mounted elsewhere on the implement 104 or even on the tractor 102.

In some embodiments, the imager system 128 may include one or more lenses 202, a body 204, and one or more actuators 206. The one or more actuators 206 may facilitate manipulation of a position and viewing angle of the one or more lenses 202 of the imager system 128. In some embodiments, the one or more actuators 206 may be capable of rotating the one or more lenses 202 about at least two axes (e.g., an X-axis and a Z-axis). The actuator 206 may include one or more mechanical/electro mechanical actuators (e.g., linear actuators and/rotary actuators). In some embodiments, the actuators 206 may be operated and controlled by the guidance system 132.

In some embodiments, the imager system 128 may include one or more of a 3D laser scanner (LiDAR), a 2D laser scanner (LiDAR), a charge-couple device (CCD) sensor, a complementary metal oxide semiconductor (CMOS) sensor, a stereoscopic camera, a monoscopic camera, an infrared (IR) camera, a short-wave infrared (SWIR) camera, or a digital single-reflex camera. Furthermore, the imager system 128 may be configured to capture data including one or more of relatively high resolution color images/video, relatively high resolution infrared images/video, or light detection and ranging data. In some embodiments, the imager system 128 may be configured to capture image data at multiple focal lengths. In some embodiments, the imager system 128 may be configured to combine multiple exposures into a single high-resolution image/video. In some embodiments, imager system 128 may include multiple image sensors (e.g., cameras) with viewing angles facing different directions. For instance, a first image sensor may generally face forward (e.g., in the F direction), and a second image sensor may generally face downward toward the soil surface 130.

In some embodiments, the imager system 128 may include at least two imager systems 128. For instance, the imager system 128 may include a first imager system 128 coupled to a first longitudinal end of the frame 118 and a second imager system 128 coupled to a second, opposite longitudinal end of the frame 118.

Figure 3:
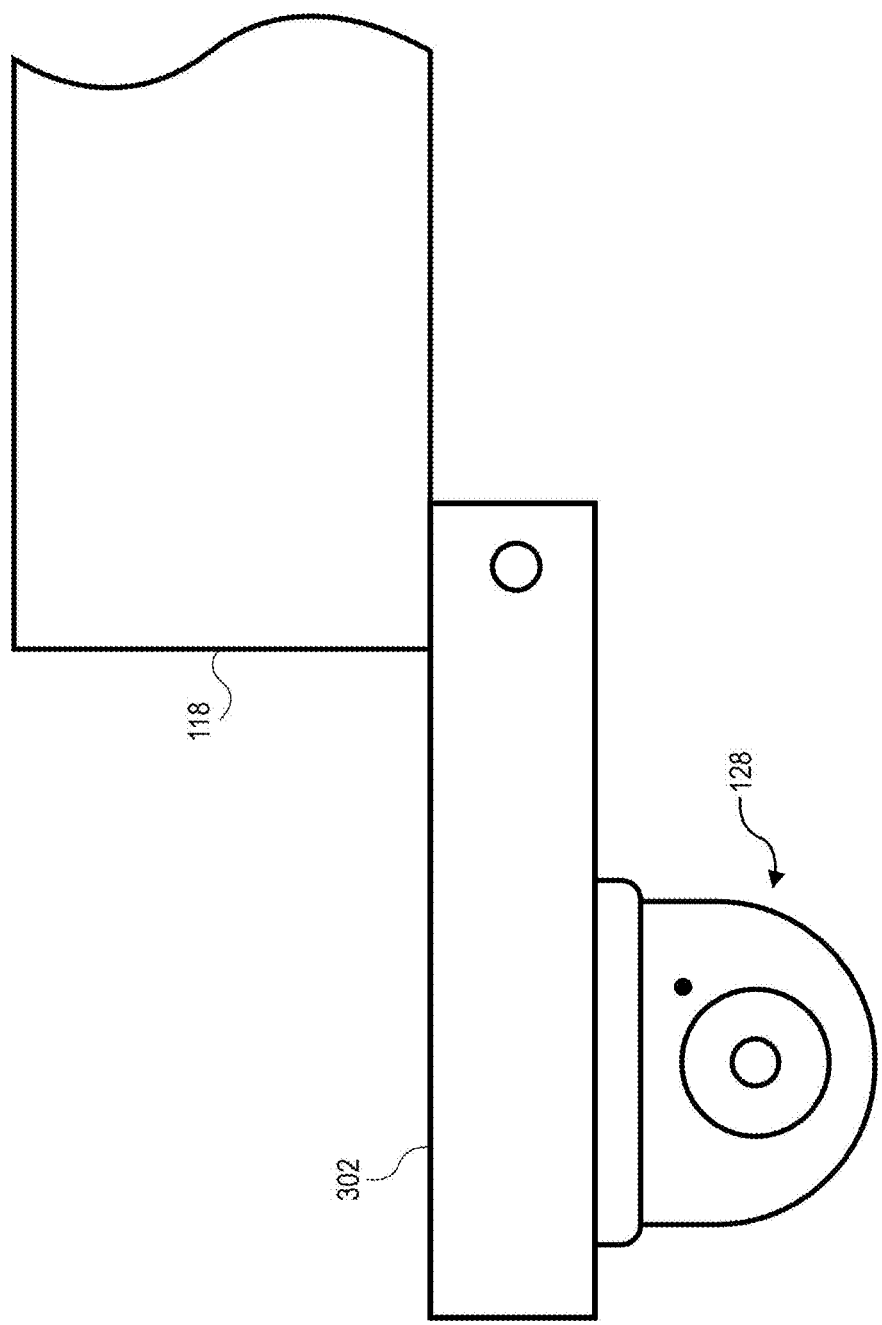
FIG. 3 shows a simplified view of an imager system according to one or more additional embodiments of the disclosure.

FIG. 3 is a schematic view of an imager system 128 according to one or more additional embodiments. As shown in FIG. 3, the imager system 128 may be mounted to an arm 302, which in turn, is mounted the frame 118 of the implement 104. The imager system 128 may include any of the imager systems described above in regard to FIG. 2.

The arm 302 may be mounted to any of a bottom surface, a top surface, a side surface, or a longitudinal end surface of the frame 118 of the implement 104. In some embodiments, the arm 302 may include one or more actuators that are operably coupled to the guidance system 132 of the central controller 122. The actuators may include any of the actuators 206 described above. In some embodiments, the arm 302 may include a telescopic arm and may be configured to extend and retract relative to the frame 118. In some embodiments, the arm 302 may be rotatably coupled to the frame 118 at a longitudinal end of the arm 302. In some embodiments, the arm 302 may be configured to pivot and rotate about at least one axis relative to the frame 118. In some embodiments, the arm 302 may be both telescopic and rotatably coupled to the frame 118. In some embodiments, the one or more actuators may be operably coupled to the guidance system 132 of the central controller 122 and, responsive to instructions, may cause the arm 302 to extend, retract, and/or rotate in order to manipulate a position and orientation of the imager system 128 relative to the frame 118.

Referring to FIG. 1, FIG. 2, and FIG. 3 together, in operation and during, for example, a planting operation, the imager system 128 may capture image data of an area of the soil surface 130 that has been worked (e.g., planted, tilled, fertilized, etc.) during a previous pass through a field (e.g., an immediately adjacent pass to a current pass through the field) to identify a boundary of the soil worked during the previous pass. As a non-limiting example, the imager system 128 may capture image data of an outermost row of a previous planting pass (e.g., a last row planted). The imager system 128 may provide the image data to the guidance system 132 and the central controller 122, which may analyze the image data to identify the boundary of soil worked during the previous pass. The foregoing analysis is described in greater detail below. Moreover, based on the identified boundary of soil worked during a previous pass, the guidance system 132 and the central controller 122 may provide visual feedback on the input/output device 126 of the central controller 122 to assist the operator in navigating the tractor 102 to align the current pass with the previous pass according to specified parameters (e.g., desired row spacing, spacing between passes, crop type, etc.).

Figure 4:
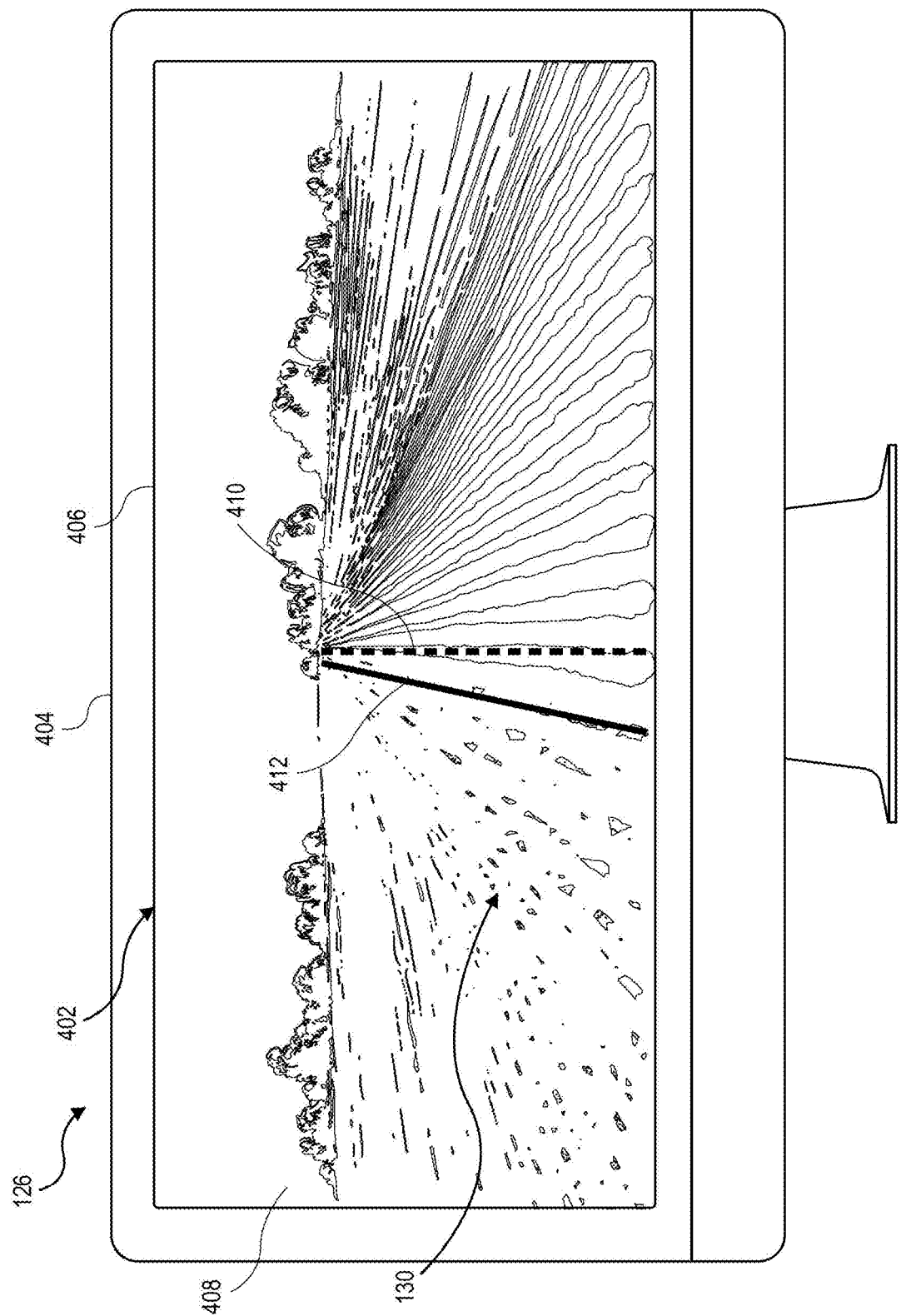
FIG. 4 shows a monitor showing a guidance GUI according to one or more embodiments of the disclosure.

FIG. 4 shows a first guidance graphical user interface ("a first guidance GUI 402") of the guidance system 132 displayed within the input/output device 126 of the central controller 122 according to some embodiments. As is described in more detail below, the guidance system 132 can provide, along and/or in combination with the other components, the first guidance GUI 402.

For purposes of the description of FIG. 4, the input/output device 126 may include a monitor 404. In additional embodiments, the input/output device 126 may include a handheld device, such as a tablet device, a laptop computer, or a mobile device. As used herein, the term "handheld device" refers to a device sized and configured to be held/operated in one or more hands of an operator.

The monitor 404 may include a screen display 406 (e.g., a touch screen display) that can display user interfaces (e.g., the first guidance GUI 402). As used herein, a "touch screen display" refers to the display of a touch screen device. In some embodiments, a touch screen device may include at least one surface upon which an operator may perform touch gestures. Accordingly, in some embodiments, the monitor 404 may receive and/or detect operator input via the screen display 406.

Referring still to FIG. 4, the screen display 406 of the monitor 404 displays the first guidance GUI 402 provided by the guidance system 132, which, in some embodiments, can be accessible by the monitor 404. In some embodiments, the first guidance GUI 402 may include a first video view 408 (e.g., a live view) of image data (e.g., video data) captured by the imager system 128, a first guidance marker 410, and a first alignment marker 412. In operation, in some embodiments, the first guidance marker 410 may be overlaid over a portion/region of the first video view 408 depicting a detected mark (e.g., a last row planted) on the soil surface 130. For example, the first guidance marker 410 may be aligned with an outermost row planted of an immediately adjacent planting pass. In additional embodiments, the first guidance marker 410 may be aligned with a boundary of the immediately adjacent planting pass. The first alignment marker 412 may also be overlaid over the first video view 408 and may represent a current orientation of the tractor 102 and/or implement 104 relative to the immediately adjacent planting pass.

Furthermore, in some embodiments, the first guidance marker 410 may represent an ideal position and orientation of the first alignment marker 412 within the first video view 408 (e.g., an ideal position and orientation of the tractor 102 and/or implement 104). As used herein, the phrase "ideal position and orientation," when used in reference to the tractor 102 and/or the implement 104, may refer to a position and orientation of the tractor 102 and/or the implement 104 that will at least substantially achieve a desired spacing between adjacent passes and/or between rows when conducting a current pass through a field adjacent to a previous pass through the field. For instance, the first guidance marker 410 may represent an ideal position and orientation of the first alignment marker 412 within the first video view 408 to achieve a proper alignment (e.g., spacing) of a current pass with (e.g., relative to) the immediately adjacent pass. Put another away, the first guidance marker 410 may correlate to a proper orientation of the tractor 102 and/or implement 104 during a current pass. As a result, during operation, an operator may navigate (e.g., steer) the tractor 102 and implement 104 to align the first alignment marker 412 with the first guidance marker 410 and to properly orient the tractor 102 and implement 104 relative to the immediately adjacent pass.

In some embodiments, the first alignment marker 412 may change colors depending on how close a current position of the first alignment marker 412 is to the first guidance marker 410 (e.g., a proximity of the first alignment marker 412 to the first guidance marker 410). For example, when a distance between the first alignment marker 412 and the first guidance marker 410 is within a first range (e.g., an acceptable range), the first alignment marker 412 may have a green color. Additionally, when a distance between the first alignment marker 412 and the first guidance marker 410 is outside of the first range but within a second range (e.g., a near acceptable range), the first alignment marker 412 may have a yellow color. Furthermore, when a distance between the first alignment marker 412 and the first guidance marker 410 is outside of the second range, the first alignment marker 412 may have a red color.

A relative position of the first alignment marker 412 within the first video view 408 may be adjustable to achieve and accommodate different specified row spacing and planting processes. For instance, prior to starting a planting process, a desired spacing distance between passes or between rows may be selected, and the first guidance marker 410 and the first alignment marker 412 may be generated and oriented over the first video view 408 in order to achieve the selected spacing distance between passes when the first guidance marker 410 and the first alignment marker 412 are aligned.

Referring still to FIG. 4, in some embodiments, the first guidance GUI 402 may include the first video view 408 (e.g., a live view) of image data (e.g., video data) captured by the imager system 128, and the first alignment marker 412 and may not include the first guidance marker 410. In such embodiments, the first alignment marker 412 may represent a current orientation of the tractor 102 and/or implement 104, and an operator may navigate the tractor 102 and/or implement 104 to align the first alignment marker 412 with a mark depicted in the first video view 408.

Figure 5:
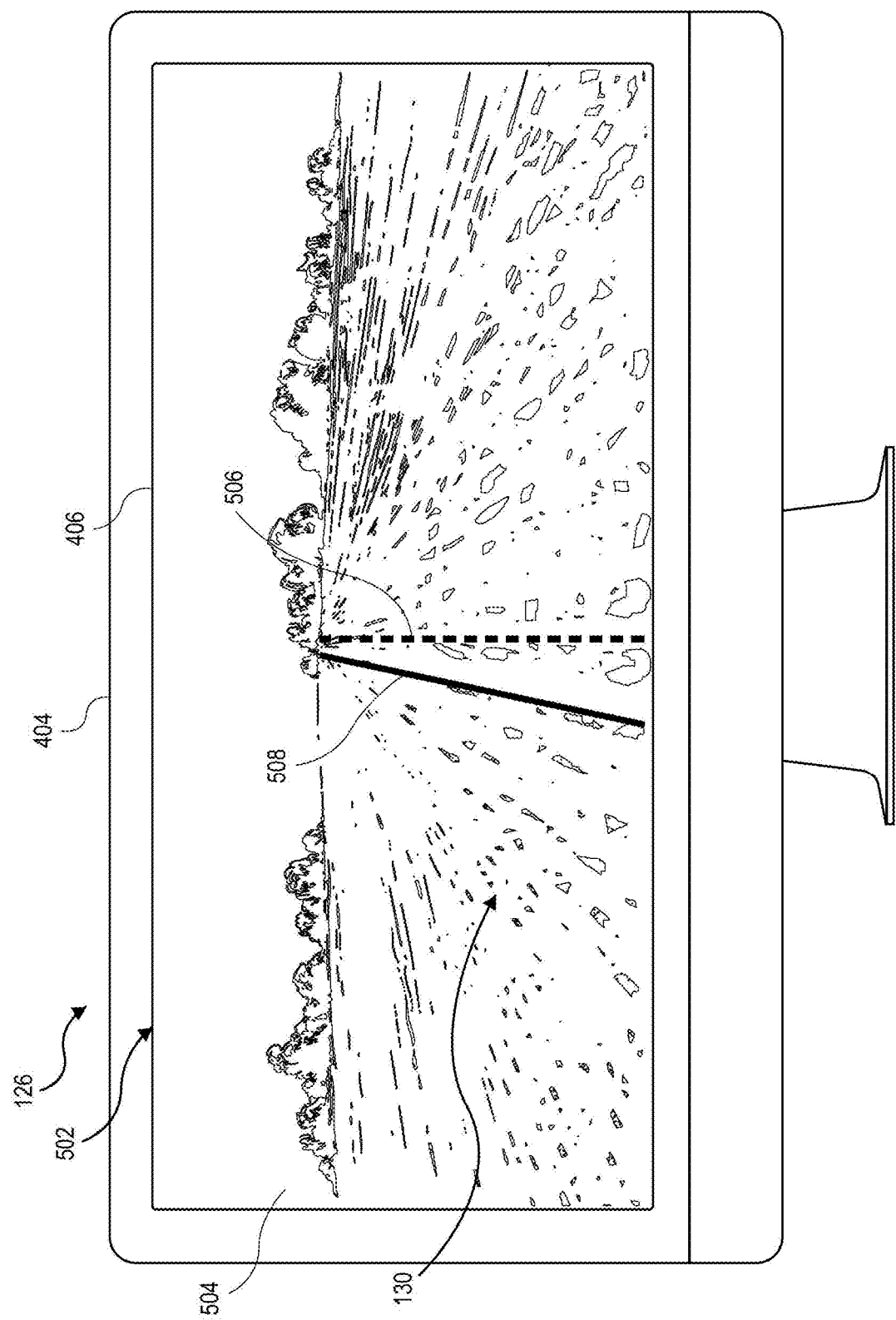
FIG. 5 shows a monitor showing a guidance GUI according to one or more additional embodiments of the disclosure.

FIG. 5 shows a second guidance graphical user interface ("a second guidance GUI 502") of the guidance system 132 displayed within the input/output device 126 of the central controller 122 according to some embodiments. The second guidance GUI 502 may be presented via any of the manners described above, and the input/output device 126 may include any of the elements and components described above.

In some embodiments, the second guidance GUI 502 may include a second video view 504 (e.g., a live view) of image data captured by the imager system 128 or another imager system (e.g., a front view camera), a second guidance marker 506, and a second alignment marker 508. In operation, in some embodiments, the second video view 504 may show a front view facing forward from a nose of the tractor 102 and not a view showing a boundary of an immediately adjacent pass. Accordingly, in some embodiments, the imager system 128 may include an additional image sensor (e.g., a front view camera) for capturing, or the imager system 128 itself may capture, a front view of the tractor 102.

The second guidance marker 506 may represent an ideal position and orientation of the second alignment marker 508 within the second video view 504. As is described in greater detail below, the relative positions of the second guidance marker 506 and the second alignment marker 508 within the second video view 504 may be determined based on a detected one or more marks (e.g., a last row planted) on a soil surface 130 formed during an immediately adjacent pass (e.g., planting pass). For instance, the second guidance marker 506 may represent an ideal position and orientation of the second alignment marker 508 within the second video view 504 to achieve a proper alignment (e.g., spacing) of a current pass with (e.g., relative to) the immediately adjacent pass. As a non-limiting example, the second guidance marker 506 may indicate an ideal centerline of a current pass. Put another away, the second guidance marker 506 may correlate to a proper orientation of the tractor 102 and/or implement 104 during a current pass. As a result, during operation, an operator may navigate the tractor 102 and implement 104 to align the second alignment marker 508 with the second guidance marker 506 and to properly orient the tractor 102 and implement 104 relative to the immediately adjacent pass.

The second guidance marker 506 and/or second alignment marker 508 may change colors according to any of the manners described above in regard to FIG. 4. Furthermore, in some embodiments, the second guidance GUI 502 may also depict the first video view 408 described in FIG. 4. For example, in some embodiments, the second guidance GUI 502 may display both the first video view 408 and the second video view 504 simultaneously. In some embodiments, the first video view 408 and the second video view 504 are displayed via a split-screen orientation, via two separate content windows, or with one view overlaying a portion of the other view.

Figure 6:
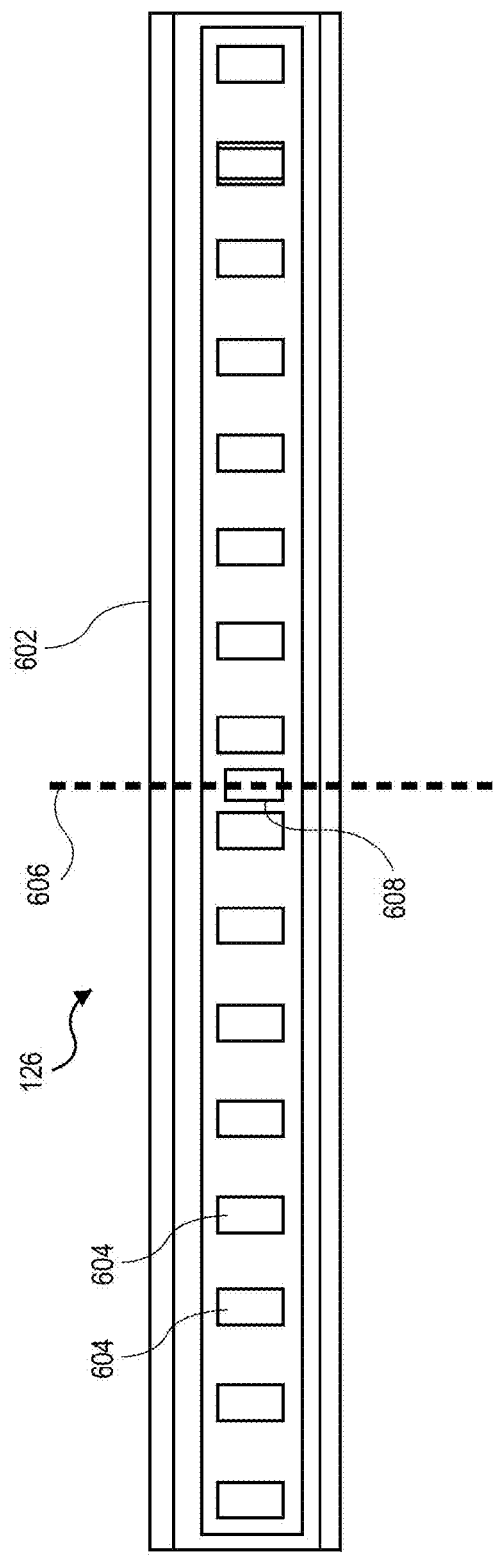
FIG. 6 shows a light bar output device according to one or more embodiments of the disclosure.

FIG. 6 shows an input/output device 126 of the central controller 122 according to one or more additional embodiments. As shown in FIG. 6, in some embodiments, the input/output device 126 may include a light bar 602 having a plurality of indicator lights 604. A center indicator light 608 aligned on a center line 606 of the light bar 602 may correlate to an ideal position and orientation of the tractor 102 and/or the implement 104 relative to an immediately adjacent pass (e.g., planting pass). Each of the indicator lights 604 may generally represent potential positions and orientations of the tractor 102 and/or the implement 104 relative to the ideal position and orientation of the tractor 102 and/or implement 104. Additionally, during operation, an illuminated light of the plurality of indicator lights 604 may indicate a current position and orientation of the tractor 102 and/or the implement 104 during a current pass relative to the ideal position and orientation of the tractor 102 and/or the implement 104.

As a result, during operation, an operator may navigate the tractor 102 and/or the implement 104 to align an illuminated indicator light 604 with the center indicator light 608 in order to properly position and orient the tractor 102 and/or the implement 104 relative to the immediately adjacent pass.

Similar to the first guidance GUI 402 and the second guidance GUI 502 described above in regard to FIG. 4 and FIG. 5, the information exhibited by the light bar 602 (e.g., a current position and orientation of the tractor 102 and/or implement 104 relative to an ideal position and orientation) during operation may be at least partially determined utilizing the imager system 128 and a detected one or more marks on the soil surface 130 of an immediately adjacent pass.

Figure 7:
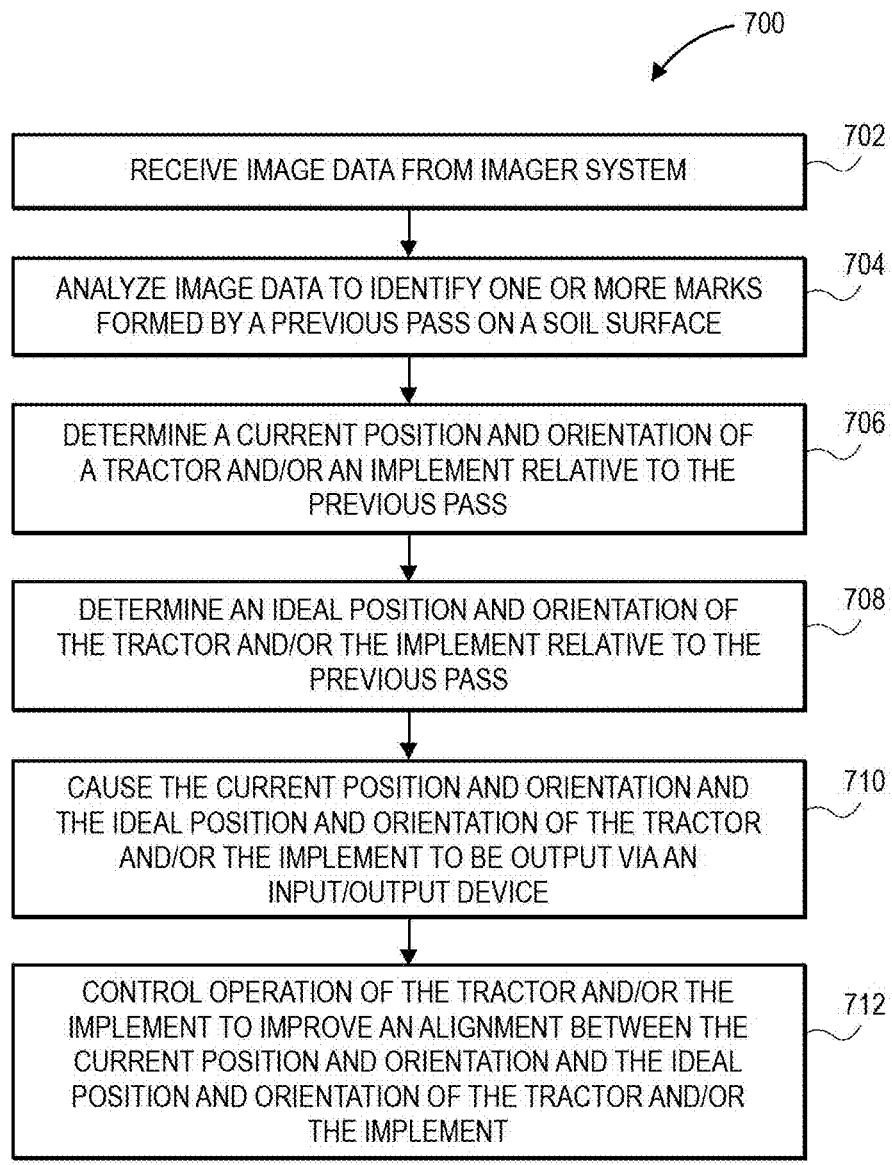
FIG. 7 shows a flowchart of a method of controlling operation of an implement according to embodiments of the disclosure.

FIG. 7 shows a method 700 of controlling operation of an agricultural implement 104 according to embodiments. Furthermore, the method 700 may be performed while performing a soil working pass (e.g., a planting or tilling pass) through a field. The method 700 may include receiving image data from the imager system 128, as shown in act 702 of FIG. 7. For example, the guidance system 132 may receive the image data from the imager system 128. The image data may include one or more of images or video (e.g., video data). The imager system 128 may include any of the imager systems 128 described above, and the imager system 128 may have captured the image data.

Responsive to receiving the image data, the method 700 may include analyzing the image data to identify one or more marks formed by a previous pass of an implement (e.g., the implement 104) on a soil surface 130, as shown in act 704 of FIG. 7. For purposes of the current description, the implement will be referred to as "implement 104;" however, the implement that formed the previous pass may include a different implement from an implement 104 performing a current pass. Furthermore, the previous pass may include an immediately adjacent pass to a current pass.

The guidance system 132 may analyze the image data to identify one or more marks indicated (e.g., captured) in the image data. In some embodiments, the one or more marks may include an outermost row (e.g., a last row, an outermost planting row, a tilling mark, a trench, etc.) formed by the previous pass of the implement 104. Furthermore, in some embodiments, based on the identified one or more marks, the guidance system 132 may identify a boundary of the previous pass. For example, based at least partially on a known geometry of a structure utilized to form the one or more marks, and a known distance of the structure form a centerline of the tractor 102 and/or the implement 104, a boundary of the previous pass may be determined. In some embodiments, the one or more marks define the boundary of the previous pass themselves.

In some embodiments, the guidance system 132 may analyze the image data via deep learning techniques to detect the one or more marks within the image data. For example, the guidance system 132 may utilize one or more of convolutional neural networks (CNNs), single shot detectors (SSDs), region-convolutional neural networks (R-CNNs), Faster R-CNN, Region-based Fully Convolutional Networks (R-FCNs) and other machine learning models to perform the mark (e.g., object) detection and classification. The foregoing models may be trained according to conventional methods to perform the mark detection and classification. In some embodiments, the guidance system 132 may determine bounding boxes (e.g., a point, width, and height) of the detected one or more marks. In additional embodiments, the guidance system 132 may perform object segmentation (e.g., object instance segmentation or sematic segmentation) to associate specific pixels of the image data within the detected one or more marks.

Responsive to identifying the one or more marks indicated in the image data, the method 700 may include determining a current position and an orientation of the tractor 102 and/or implement 104 relative to the previous pass having the one or more marks, as shown in act 706 of FIG. 7. In some embodiments, the central controller 122 may determine the current position and the orientation of the tractor 102 and/or implement 104 relative to the previous pass utilizing a known viewing angle (e.g., a selected viewing angle) of the imager system 128, a position and orientation of the detected one or more marks within a viewing window of the imager system 128, a known location of the imager system 128 relative to other portions (e.g., a centerline) of the tractor 102 and/or implement 104, and/or GPS data from the GPS 124.

Additionally, the method 700 may include determining an ideal position and orientation of the tractor and/or the implement relative to the previous pass, as shown in act 708 of FIG. 7. In some embodiments, the central controller 122 may determine the ideal position and orientation of the tractor 102 and/or implement 104 relative to the previous pass utilizing a known viewing angle (e.g., a selected viewing angle) of the imager system 128, a position and orientation of the detected one or more marks within a viewing window of the imager system 128, a known location of the imager system 128 relative to other portions (e.g., a centerline) of the tractor 102 and/or implement 104, GPS data from the GPS 124, and specified spacing requirements (e.g., desired spacing between passes and/or rows).

Responsive to determining both a current and an ideal position and orientation of the tractor 102 and/or implement 104, the method 700 may include causing both the current position and orientation and the ideal position and orientation of the tractor 102 and/or implement 104 to be output via the input/output device 126 of the central controller 122, as shown in act 710 of FIG. 7. For example, the current position and orientation and the ideal position and orientation of the tractor 102 and/or implement 104 may be output via any of the manners described above in regard to FIG. 4, FIG. 5, and FIG. 6. As a non-limiting example, the current position and orientation may be displayed within a GUI as an alignment marker and the ideal position and orientation may be displayed within the GUI as a guidance marker. Moreover, acts 702-710 may be iteratively and/or continuously repeated during operation of the tractor 102 and/or implement 104 (e.g., during a planting process). As a result, an operator may have continuous or at least substantially continuous feedback regarding a current position of the tractor 102 and/or implement 104 relative to an ideal position of the tractor 102 and/or implement 104.

In some embodiments, the method 700 may optionally include controlling operation of the tractor 102 and/or the implement 104 to improve an alignment between the current position and orientation and the ideal position and orientation of the tractor 102 and/or the implement 104, as shown in act 712 of FIG. 7. For example, the central controller 122 may control operation (e.g., navigation) of the tractor 102 and/or the implement 104 to improve an alignment between the current position and orientation and the ideal position and orientation of the tractor 102 and/or the implement 104. In some embodiments, the central controller 122 may adjust navigation of the tractor 102 and/or the implement 104 to improve an alignment automatically and without operator input. In some embodiments, the central controller 122 may recommend an adjustment to operation of the tractor 102 and/or the implement 104 to improve an alignment that requires an operator to approve the recommendation. The recommendation may be displayed on the input/output device 126 and may require operator input to approve.

In some embodiments, the central controller 122 may automatically make adjustments to operation of the tractor 102 and/or the implement 104 when the required adjustments are relatively minor (e.g., include a change of direction of less than a specified degree), and the central controller 122 may require an operator to make adjustments to operation of the tractor 102 and/or the implement 104 when the required adjustments are relatively major (e.g., include a change of direction of more than a specified degree).

Referring still to FIG. 7, in some embodiments, the central controller 122 may not control operation of the tractor 102 and/or the implement 104 to improve an alignment between the current position and orientation and the ideal position and orientation of the tractor 102 and/or the implement 104. Rather, the current and ideal positions and orientations may be provided on the input/output device 126, and an operator may choose whether or not to adjust operation of the tractor 102 and/or the implement 104.

Referring to the foregoing FIGS. together, the guidance system 132 and the method 700 of controlling operation of a tractor 102 and/or an implement 104 by detecting one or more markers via the guidance system 132 of the current disclosure may provide advantages over conventional marker assemblies (e.g., foldable markers) and methods of controlling operation of tractors and implements based on markers. For example, relative to marks made by conventional markers (e.g., coulter disks), the guidance system 132 and method 700 may make marks easier to see for an operator by displaying the marks on a display within a cab of the tractor 102. As a result, the guidance system 132 and method 700 may increase a range of hours during a day within which a tractor 102 and implement 104 may be efficiently operated while following marks. For example, the imager system 128 of the guidance system 132 may require less light to detect marks than the human eye. Furthermore, the guidance system 132 and method 700 may remove any need for an operator to visually detect the marks in the soil surface 130. Rather, because the guidance system 132 indicates the marks via guidance markers on the display, any need for an operator to distinguish the mark relative to the soil surface 130 is removed. As a result, the guidance system 132 and method 700 may reduce the likelihood of an operator mistaking marks and/or missing marks. Therefore, the guidance system 132 and method 700 may reduce operator error and may improve operator performance.

Moreover, the required structure of guidance system 132 and the method 700 may be significantly smaller than conventional folding markers and related systems. Likewise, the guidance system 132 and the method 700 may be less expensive than conventional folding markers and related systems.

Additionally, the guidance system 132 and the method 700 of the current disclosure may improve accuracy of forming adjacent passes with appropriate spacing or the lack thereof between the adjacent passes. Accordingly, the guidance system 132 and the method 700 may minimize overlapping between passes and may minimize unused soil surface 130, which minimizes seed and/or fertilizer waste. Moreover, by improving accuracy, the guidance system 132 and the method 700 may reduce planting and fertilization time and may reduce fuel usage and operation costs, while improving yield.

Figure 8:
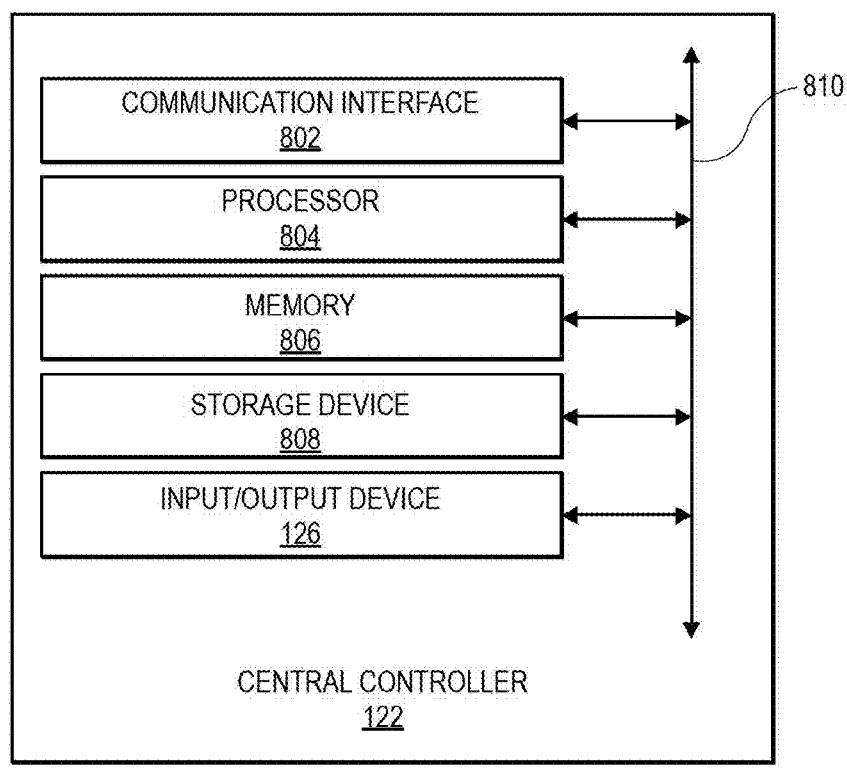
FIG. 8 is a schematic view of a central controller according to embodiments of the disclosure.

FIG. 8 is a schematic view of the central controller 122, which may operate the guidance system 132 according to some embodiments of the disclosure. The central controller 122 may include a communication interface 802, a processor 804, a memory 806, a storage device 808, and a bus 810 in addition to the input/output device 126.

In some embodiments, the processor 804 includes hardware for executing instructions, such as those making up a computer program. As an example, and not by way of limitation, to execute instructions, the processor 804 may retrieve (or fetch) the instructions from an internal register, an internal cache, the memory 806, or the storage device 808 and decode and execute them. In some embodiments, the processor 804 may include one or more internal caches for data, instructions, or addresses. As an example, and not by way of limitation, the processor 804 may include one or more instruction caches, one or more data caches, and one or more translation look aside buffers (TLBs). Instructions in the instruction caches may be copies of instructions in the memory 806 or the storage device 808.

The memory 806 may be coupled to the processor 804. The memory 806 may be used for storing data, metadata, and programs for execution by the processor(s). The memory 806 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 806 may be internal or distributed memory.

The storage device 808 may include storage for storing data or instructions. As an example, and not by way of limitation, storage device 808 can comprise a non-transitory storage medium described above. The storage device 808 may include a hard disk drive (HDD), Flash memory, an optical disc, a magneto-optical disc, magnetic tape, or a Universal Serial Bus (USB) drive or a combination of two or more of these. The storage device 808 may include removable or non-removable (or fixed) media, where appropriate. The storage device 808 may be internal or external to the computing storage device 808. In one or more embodiments, the storage device 808 is non-volatile, solid-state memory. In other embodiments, the storage device 808 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The communication interface 802 can include hardware, software, or both. The communication interface 802 may provide one or more interfaces for communication (such as, for example, packet-based communication) between the central controller 122 and one or more other computing devices or networks (e.g., the imager system 128, a server, etc.). As an example, and not by way of limitation, the communication interface 802 may include a network interface controller (NIC) or network adapter for communicating with an Ethernet or other wire-based network or a wireless NIC (WNIC) or wireless adapter for communicating with a wireless network, such as a WI-FI.

In some embodiments, the bus 810 (e.g., a Controller Area Network (CAN) bus) may include hardware, software, or both that couples components of central controller 122 to each other and to external components. The input/output device 126 is described above in regard to FIG. 1.

All references cited herein are incorporated herein in their entireties. If there is a conflict between definitions herein and in an incorporated reference, the definition herein shall control.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A system, comprising:
    an agricultural implement, comprising:
        a frame extending perpendicular to a forward direction of travel of the implement, having longitudinal ends distal from a center of the implement;
        a plurality of ground-engaging tools carried by the frame; and
        at least one imager system coupled to the frame proximate one of the longitudinal ends of the frame; and
    a vehicle configured to pull the implement and having a central controller, wherein the at least one imager system is operably coupled to the central controller and the central controller comprises:
        at least one processor; and
        at least one non-transitory computer-readable storage medium storing instructions thereon that, when executed by the at least one processor, cause the central controller to:
            receive image data from the at least one imager system;
            receive a selected spacing distance between passes or between rows:
            based at least partially on the received image data, display at least a portion of the image data on a display, display a guidance marker representing an ideal position and orientation of the implement and overlaying the guidance marker over a first region of the displayed image data, and display an alignment marker representing a current position and orientation of the implement and overlaying the alignment marker over a second region of the displayed image data, the guidance marker being presented on the display to achieve the selected spacing distance between passes or between rows when the first guidance marker and the first alignment marker are aligned.

2. The agricultural implement of claim 1, wherein the at least one imager system comprises a plurality of cameras having different viewing angles.

3. The agricultural implement of claim 1, wherein the at least one imager system is configured to provide image data to a guidance system of a central controller.

4. The agricultural implement of claim 1, wherein the at least one imager system comprises at least one actuator configured to rotate a lens of the at least one imager system about at least one axis.

5. The agricultural implement of claim 1, wherein the at least one imager system comprises at least two imager systems, with a first imager system being coupled to a first longitudinal end of the frame and a second imager system being coupled to a second, opposite longitudinal end of the frame.

6. The agricultural implement of claim 1, wherein the at least one imager system comprises at least one of a 3D laser scanner (LiDAR), a 2D laser scanner (LiDAR), a CCD sensor, a CMOS sensor, a stereoscopic camera, a monoscopic camera, an infrared (IR) camera, a short-wave infrared (SWIR) camera, or a digital single-reflex camera.

7. The agricultural implement of claim 1, wherein the at least one imager system is coupled to the frame via an arm.

8. The agricultural implement of claim 7, wherein the arm comprises a telescopic arm.

9. The agricultural implement of claim 7, wherein the arm is rotatably coupled to the frame.

10. A method of controlling operation of an implement, the method comprising:
    receiving image data from an imager system, the image data including images of at least a portion of a previous pass performed by the implement through a field;
    receiving a selected spacing distance between passes or between rows;
    analyzing the image data to identify at least one mark formed in a soil surface by the previous pass;
    determining a current position and orientation of the implement relative to the previous pass;
    determining an ideal position and orientation of the implement relative to the previous pass; and
    displaying at least a portion of the image data via an input/output device;
    displaying a guidance marker representing the ideal position and orientation of the implement and overlaying the guidance marker over a first region of the displayed image data; and
    displaying an alignment marker representing the current position and orientation of the implement and overlaying the alignment marker over a second region of the displayed image data, the guidance marker being presented on the display to achieve the selected spacing distance between passes or between rows when the first guidance marker and the first alignment marker are aligned.

11. The method of claim 10, wherein analyzing the image data comprises analyzing the image data via at least one deep learning model.

12. The method of claim 10, wherein overlaying the guidance marker over a region of the displayed image data comprises overlaying the guidance marker over a region of the displayed image data representing the identified at least one mark.

13. The method of claim 10, further comprising determining a color of at least one of the guidance marker or the alignment marker based on a proximity of the guidance marker and the alignment marker.

14. The method of claim 10, further comprising controlling operation of the implement to improve an alignment between the determined current position and orientation and the determined ideal position and orientation.

15. The method of claim 14, wherein controlling operation of the implement to improve an alignment between the determined current position and orientation and the determined ideal position and orientation is performed automatically without operator input.

16. The method of claim 10, wherein causing the current position and orientation and the ideal position and orientation of the implement to be output via the input/output device comprises causing the current position and orientation and the ideal position and orientation of the implement to be indicated on a monitor of a tractor pulling the implement.

17. A system, comprising:
an agricultural implement, comprising:
a frame supporting at least one ground-engaging; and
at least one imager system coupled to a longitudinal end of the frame; and
a tractor configured to pull the implement and having a central controller, wherein the at least one imager system is operably coupled to the central controller and the central controller comprises:
at least one processor; and
at least one non-transitory computer-readable storage medium storing instructions thereon that, when executed by the at least one processor, cause the central controller to:
receive image data from the at least one imager system;
receiving a selected spacing distance between passes or between rows;
analyze the image data to identify at least one mark formed in a soil surface; and
responsive to identifying the at least one mark, display at least a portion of the image data on a display, display a guidance marker representing an ideal position and orientation of the implement and overlaying the guidance marker over a first region of the displayed image data, and display an alignment marker representing a current position and orientation of the implement and overlaying the alignment marker over a second region of the displayed image data, the guidance marker being presented on the display to achieve the selected spacing distance between passes or between rows when the first guidance marker and the first alignment marker are aligned.

18. The system of claim 17, wherein analyzing the image data to identify the at least one mark formed in the soil surface comprises analyzing the image data via at least one deep learning technique.

19. The system of claim 17, wherein the input/output device comprises a monitor within the tractor.

* * * * *